United States Patent
Zhang et al.

(10) Patent No.: US 12,026,023 B2
(45) Date of Patent: Jul. 2, 2024

(54) SUPPORT ASSEMBLY AND CHASSIS STRUCTURE HAVING THE SAME

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Zhao-Li Zhang, Wuhan (CN); Yi-Sheng Lin, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 66 days.

(21) Appl. No.: 18/070,330

(22) Filed: Nov. 28, 2022

(65) Prior Publication Data

US 2023/0176631 A1    Jun. 8, 2023

(30) Foreign Application Priority Data

Dec. 8, 2021  (CN) .......................... 202123065624.6

(51) Int. Cl.
  *G06F 1/18*       (2006.01)

(52) U.S. Cl.
  CPC .................................. *G06F 1/183* (2013.01)

(58) Field of Classification Search
  CPC ....................................................... H05K 7/00
  See application file for complete search history.

(56) References Cited

U.S. PATENT DOCUMENTS 10,520,993 B1 *  12/2019  Han ........................ G06F 1/186
10,779,431 B1 *   9/2020  Ho ....................... H05K 5/0286

* cited by examiner

*Primary Examiner* — Jerry Wu
(74) *Attorney, Agent, or Firm* — ScienBiziP, P.C.

(57) ABSTRACT

A support assembly and a chassis structure for positioning and support of large and heavy computer cards. The chassis structure includes a housing, a main board in the housing, and a graphics card slot on the main board. The housing includes a positioning frame on the main board and the support assembly on the frame. The support assembly is detachable. The support assembly includes positioning base plate, positioning member, and adjusting member. The positioning member is on a base which is detachable from the positioning frame. The adjusting member is moveable. The positioning member includes a first support portion, the adjusting member includes a second support portion. Depending on card size, either the first support portion or the second support portion abuts against an end side of a graphics card away from the graphics card slot, to position and firmly hold in place graphics cards of different sizes.

18 Claims, 11 Drawing Sheets

SUPPORT ASSEMBLY AND CHASSIS STRUCTURE HAVING THE SAME

FIELD

The subject matter herein relates to technical field of computer accessories, especially relates to support assembly and chassis structure having the support assembly.

BACKGROUND

Computers have gradually entered all aspects of human life and become indispensable and important equipment for learning, working, living, and entertainment. The continuous increase in demands for computer performance also applies to the graphics card. The size and the weight of the graphics card are getting larger and heavier. Existing card slot of a main board, supporting only one side of the card. Larger and heavier graphics card may not be effectively supported by existing card slots. If a graphics card is held in a frail manner and not firmly fixed, the graphics card may have a poor contact with the main board and be vulnerability to impacts or shocks. In some serious scenarios, it may result in short circuiting and burning of the graphics card, slot, or main board, causing economic losses.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding portions throughout the several views.

DESCRIPTION OF MAIN COMPONENTS OR ELEMENTS

Chassis structure 100;
Housing 10;
Main board 11;
Graphics card slot 111;
Positioning frame 20;
Positioning hole 21;
Second slot 22;
Support assembly 30;
Positioning base plate 31;
Second snap 311;
Positioning pin 32;
Projection portion 321;
Positioning member 33;
First support portion 331;
Elastic holding portion 332;
Adjusting member 34;
Second support portion 341;
First snap 342;
Third support portion 343;
First elastic member 35;
Switch 36;
Pressing portion 361;
Connecting portion 362;
Mounting hole 3621;
Connecting groove 3622;
Second elastic member 37;
Receiving cavity 38;
First slot 381.

DETAILED DESCRIPTION

In order to make the above-mentioned objects, features, and advantages of the present disclosure more obvious, a description of specific embodiments of the present disclosure will be described with reference to the accompanying drawings. The present disclosure can be implemented in ways different from those described herein, and those skilled in the art can make similar improvements without violating the contents of the present disclosure. Therefore, the present disclosure is not to be considered as limiting the scope of the embodiments to those described herein.

Several definitions that apply throughout this disclosure will now be presented.

Unless otherwise defined, all technical and scientific terms used herein have the same meaning as commonly understood by one skilled in the art. The terms used in the present disclosure herein are only for describing specific embodiments, and are not intended to limit the present disclosure.

Figure 1:
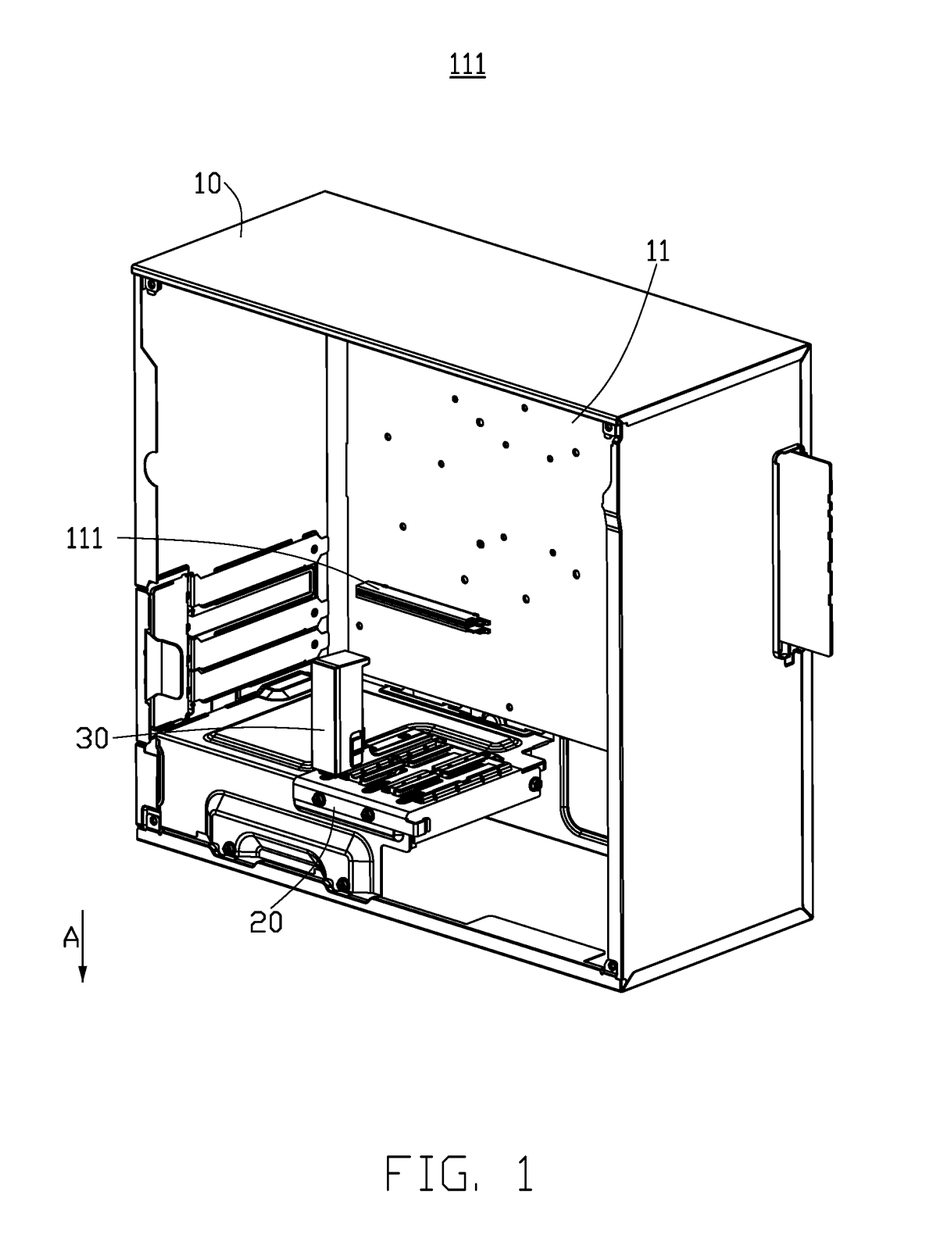
FIG. 1 is a schematic view of a chassis structure in an embodiment according to the present disclosure.
Figure 2:
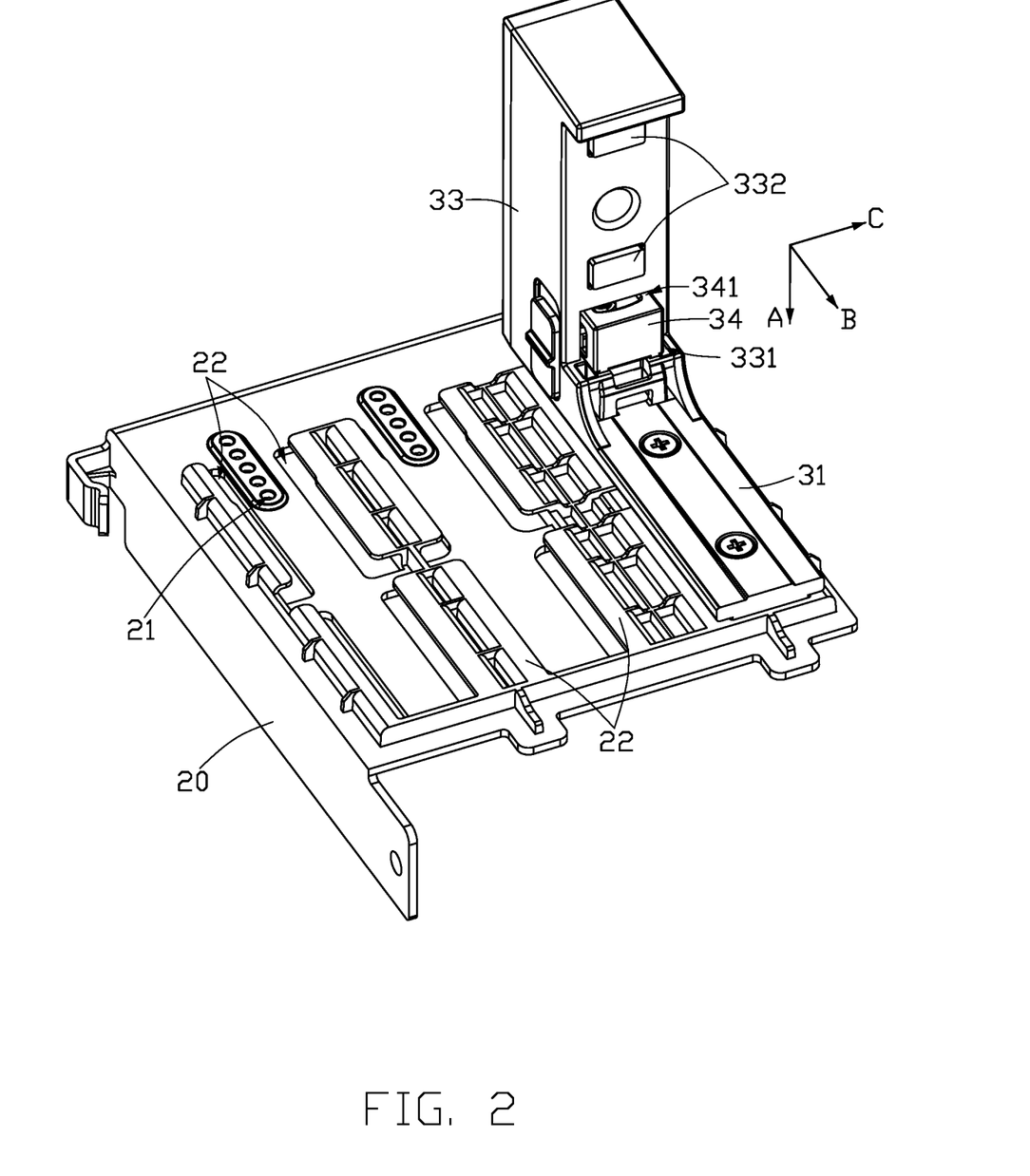
FIG. 2 is a schematic view of a portion of the chassis structure of FIG. 1.
Figure 3:
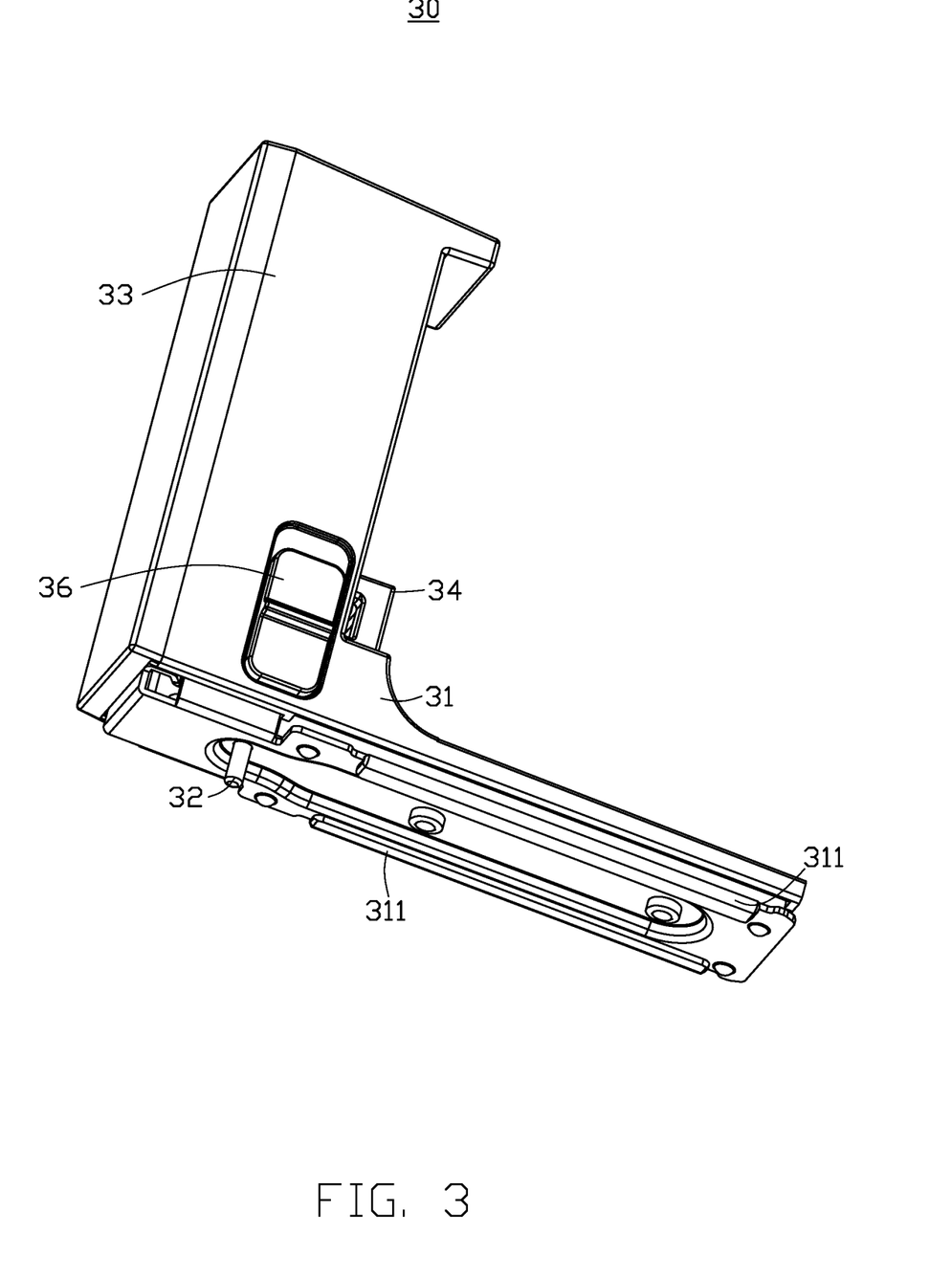
FIG. 3 is a schematic view of a support assembly of the chassis structure of FIG. 1.

Referring to FIG. 1, FIG. 2, and FIG. 3, an embodiment of a chassis structure 100 includes a housing 10, a main board 11 positioned in the housing 10, and a graphics card slot 111 positioned on the main board 11. The graphics card slot 111 accepts installation of a graphics card. The housing 10 also includes a positioning frame 20 and a support assembly 30 for enhance support of large computer card in card slots. The positioning frame 20 is positioned on a side of the main board 11. The support assembly 30 is configured to support the graphics card. The support assembly 30 is detachably fixed on the positioning frame 20.

A positioning hole 21 corresponding to the support assembly 30 is defined on the positioning frame 20. The support assembly 30 includes a positioning base plate 31, a positioning pin 32, a positioning member 33, and an adjusting member 34. The positioning member 33 secures the fixing of a graphics card inserted in the graphics card slot 111 and is positioned on the positioning base plate 31. The positioning base plate 31 is detachably connected with the positioning frame 20. The positioning pin 32 is positioned on the positioning base plate31 and can be moved along a first direction A. An end of the positioning pin 32 protrudes out of the positioning base plate31 and is positioned in the positioning hole 21. The adjusting member 34 is moveably positioned on the positioning member 33. The positioning member 33 includes a first support portion 331, and the adjusting member 34 includes a second support portion 341. The first support portion 331 and the second support portion 341 are vertically spaced in first direction A, direction A being the direction of gravity as shown in FIG. 2. When the graphics card is installed in the graphics card slot 111, the first support portion 331 or the second support portion 341 will abut against a side of an end of the graphics card away from the graphics card slot 111, allowing graphics cards of different sizes to be fixed in place.

It should be explained that there are many sizes of graphics cards on the market, including many sizes of length and of thickness, while the standard width can be classified into three basic categories. Therefore, the support assembly 30 designed to limit and support the graphics card widthways is of wide applicability and is low in cost. In the embodiment of the present application, the positioning member 33 is vertically positioned with the positioning base plate 31, so that the support assembly 30 forms an L-shaped structure. The positioning base plate 31 is secured on the positioning frame 20 by the positioning pin 32 through the positioning hole 21.

Figure 4:
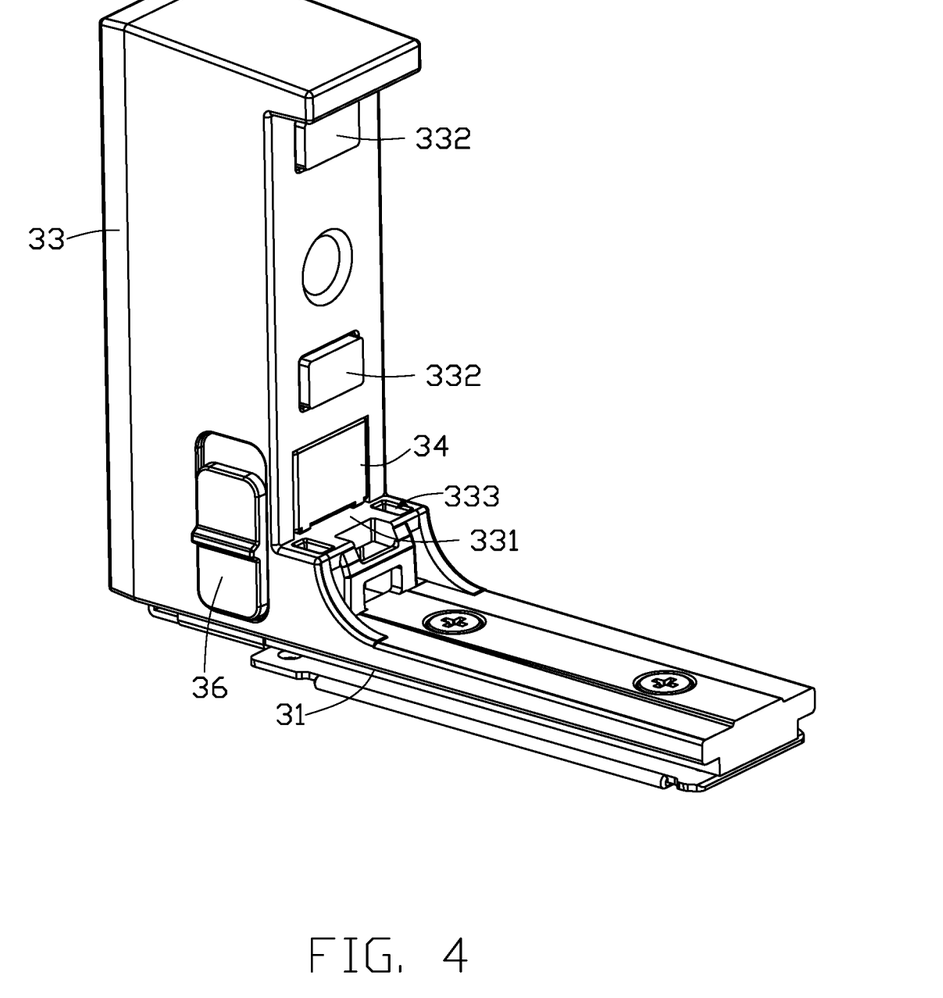
FIG. 4 is a schematic view of an adjusting member in a first position of the chassis structure of FIG. 1.
Figure 5:
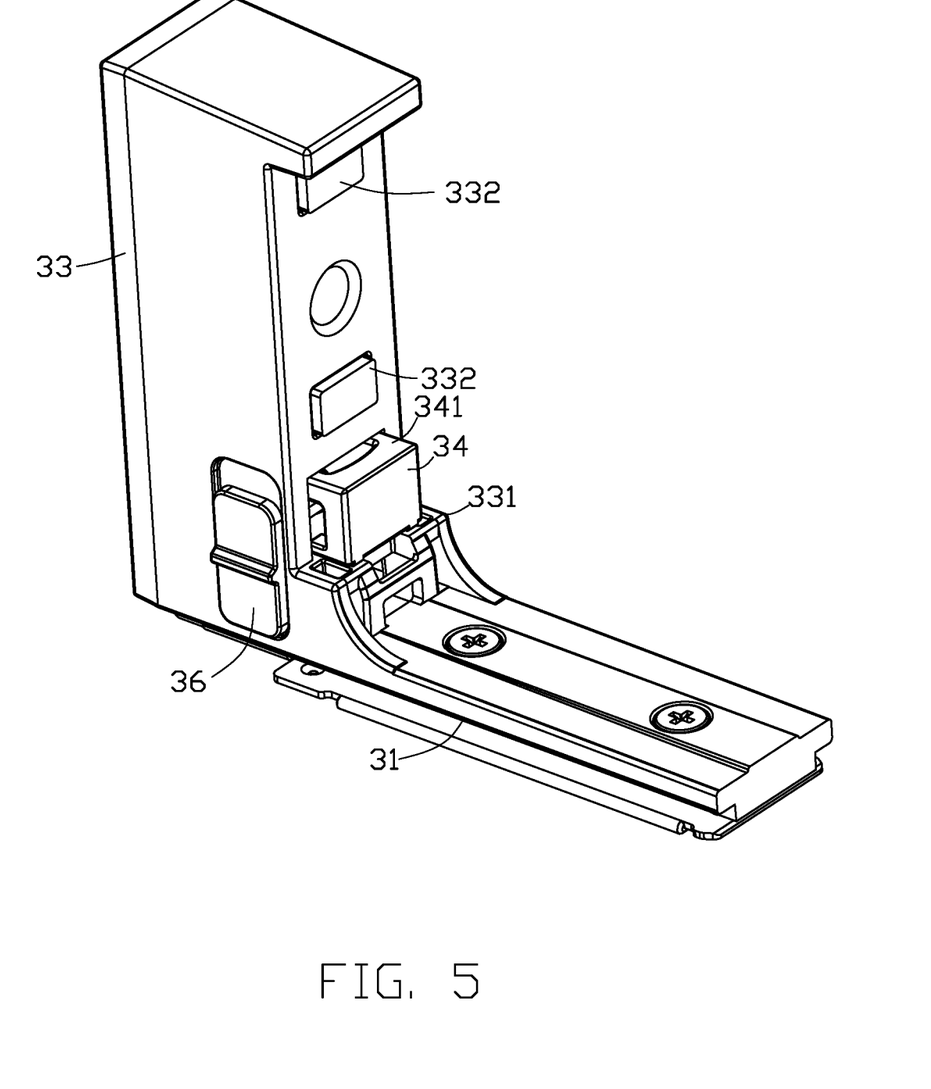
FIG. 5 is a schematic view of the adjusting member in a second position of the chassis structure of FIG. 1.

The adjusting member 34 can be moved between a first position and a second position. As shown in FIG. 4, when the adjusting member 34 is in the first position, that is, the adjusting member 34 is received into the positioning member 33, the first support portion 331 on the positioning member 33 abuts against a bottom surface of the end of the graphics card away from the graphics card slot 111. This configuration is applicable to graphics cards of a larger size and width. When the adjusting member 34 is in the second position, as shown in FIG. 5, that is, when the adjusting member 34 moves out of the positioning member 33, and becomes convex, the second support portion 341 on the adjusting member 34 abuts against the bottom surface of the end of the graphics card away from the graphics card slots 111. This configuration is intended for narrower graphics cards of a smaller size. By changing the position of the adjusting member 34, graphics cards of different sizes and specifications can be accommodated. One end of the graphics card is inserted into the graphics card slot 111, and the other end is held by the positioning member 33 or the adjusting member 34 of the support assembly 30 to achieve strong and stable support. Elastic holding portions 332 are positioned at a side of the positioning member 33 facing the graphics card slot 111 for permanent but delicate contact with the graphics card. There are at least two elastic holding portions 332 spaced from each other.

Figure 6:
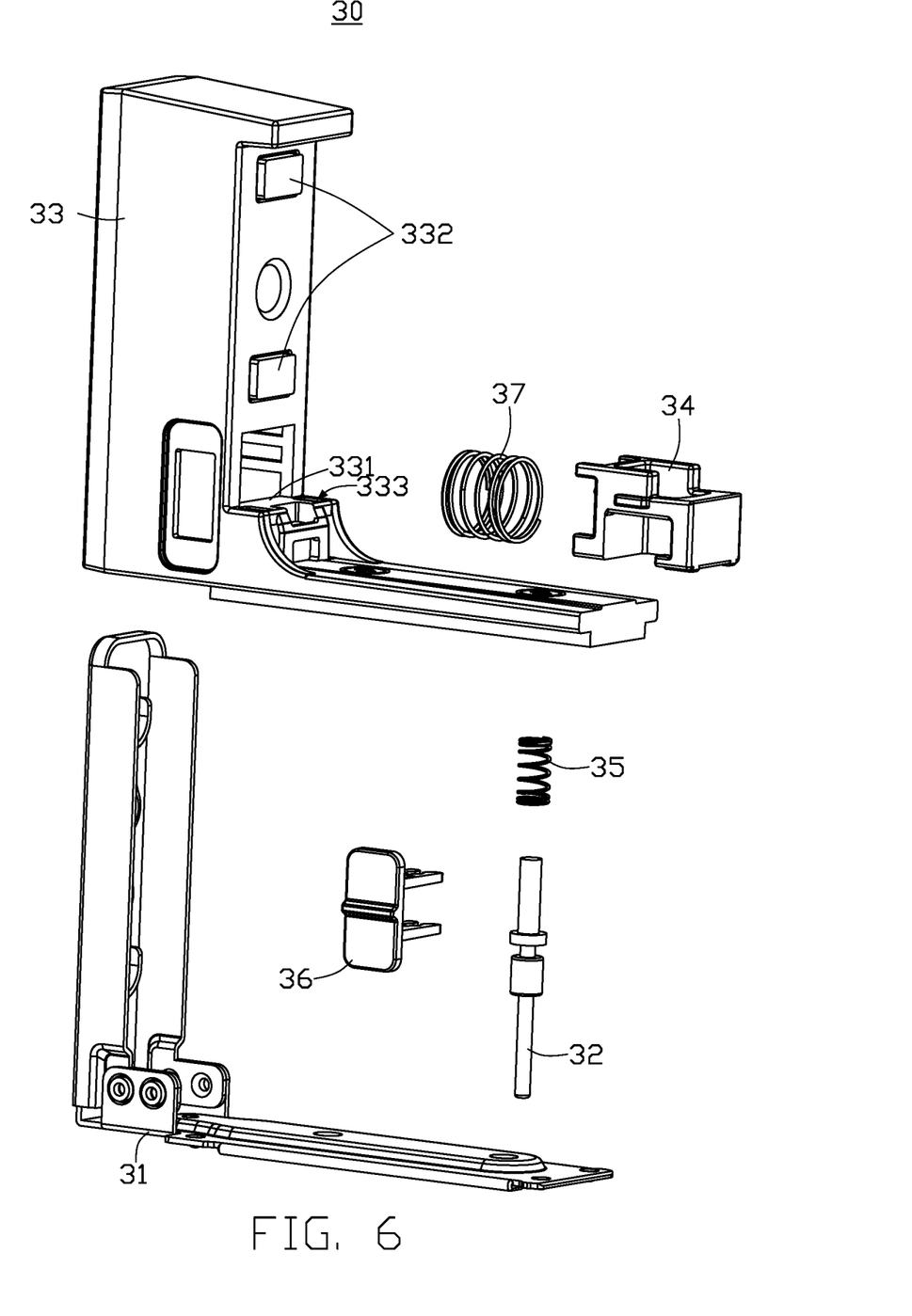
FIG. 6 is an exploded view of the supporting assembly of the chassis structure of FIG. 1.

Referring to FIG. 6, in an embodiment, the support assembly 30 includes a first elastic member 35 and a switch 36 positioned in the first direction A. The first elastic member 35 connects the positioning pin 32 and the positioning member 33. The switch 36 is positioned at a side of the support assembly 30, and the switch 36 connects with the positioning pin 32. The switch 36 can drive the positioning pin 32 to move in the first direction A, causing the positioning pin 32 to penetrate the positioning base plate 31, so as to further penetrate the positioning hole 21 and achieve connection and fixation between the support assembly 30 and the positioning frame 20. The switch 36 also can cause the positioning pin 32 to be received in the positioning base plate 31, so that the support assembly 30 can be separated from the positioning frame 20. The first elastic member 35 presses against the positioning pin 32, so the positioning pin 32 returns to the locked state when there is no external force.

Figure 7:
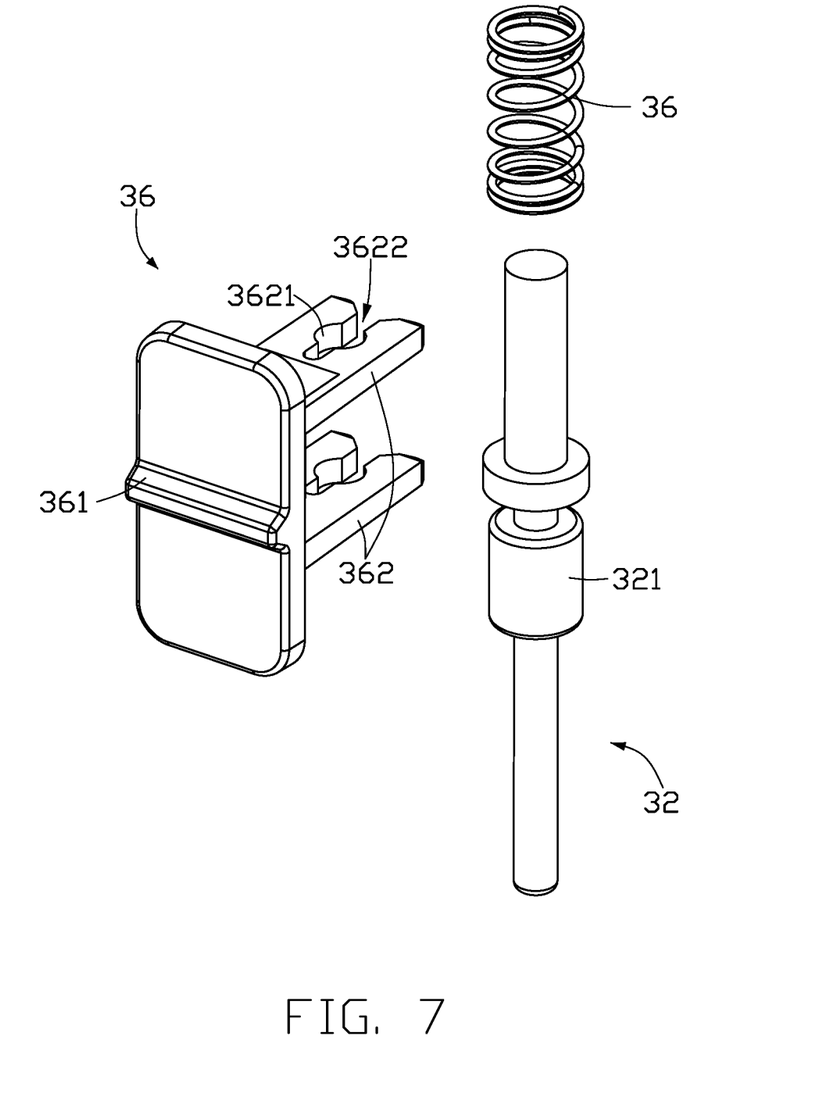
FIG. 7 is another exploded view of a portion of the supporting assembly of the chassis structure of FIG. 1.

Referring to FIG. 7, in an embodiment, the switch 36 includes a pressing portion 361 and a connecting portion 362 in one piece. The connecting portion 362 is sleeved on the positioning pin 32. The positioning pin 32 includes a projection portion 321. The connecting portion 362 abuts against the projection portion 321. In the embodiment of the present application, the pressing portion 361 protrudes from a side of the switch 36 away from the positioning pin 32, and the connecting portion 362 is positioned at a side of the switch 36 facing the positioning pin 32. In the embodiment of the present application, two connecting portions 362 are spaced apart in first direction A, the projection portion 321 is positioned between the two connecting portions 362. Each connecting portion 362 carries a mounting hole 3621 and a connecting groove 3622. The mounting hole 3621 communicates with connecting groove 3622, and the connecting groove 3622 defines an opening at an end of the connecting portion 362. A width of the connecting groove 3622 is slightly less than an aperture of the mounting hole 3621. The positioning pin 32 is clamped into the mounting hole 3621 from the connection groove 3622 to connect the positioning pin 32 and the switch 36. The projection portion 321 on the positioning pin 32 can be a cylindrical structure. When the positioning pin 32 is connected with the switch 36, the projection portion 321 is clamped in the two connection portions 362 and abuts against the two portions 362, enabling the switch 36 to drive the positioning pin 32 when operated.

Figure 8:
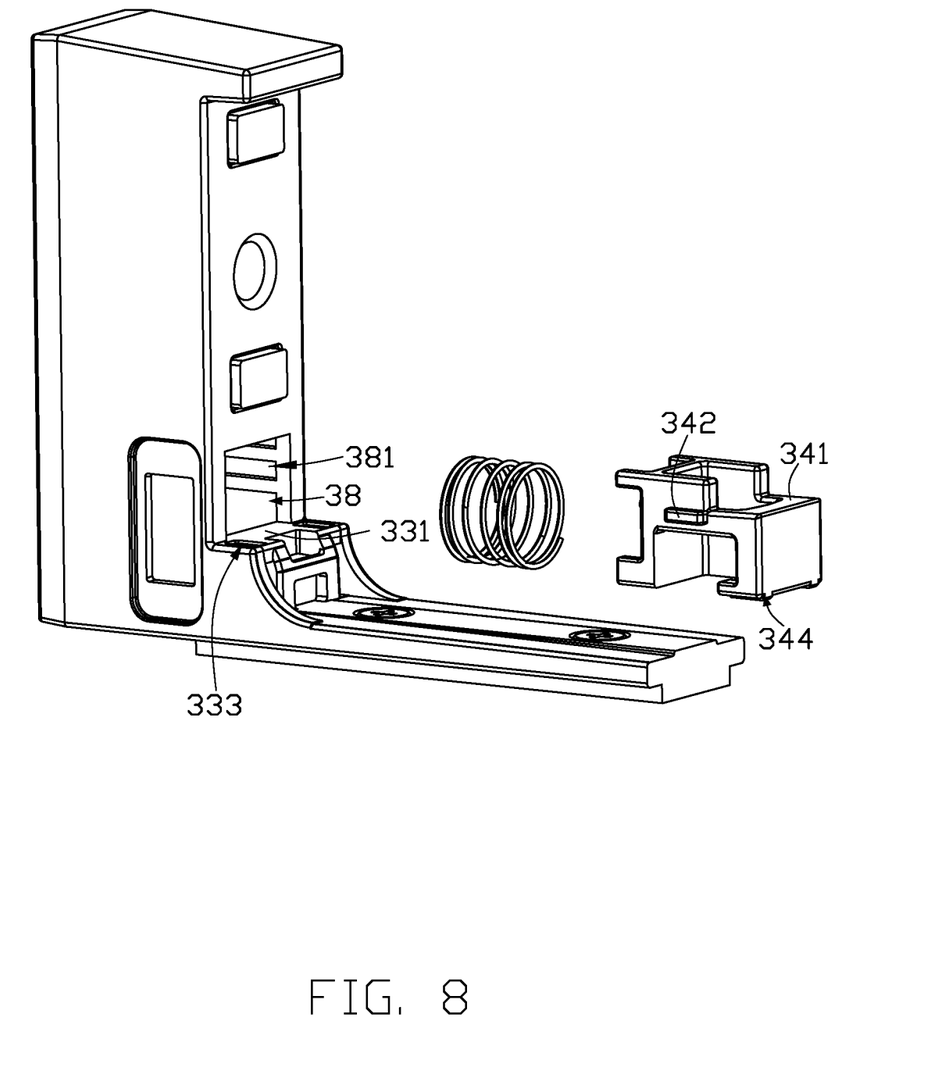
FIG. 8 is another exploded view of a portion of the supporting assembly of the chassis structure of FIG. 1.

In one embodiment, referring to FIG. 2, and FIG. 6 and FIG. 8, the support assembly 30 includes a second elastic member 37 positioned along second direction B, direction B being parallel to the graphics card slot 111. The second elastic member 37 connects the adjusting member 34 and the positioning member 33. The second direction B is perpendicular with the first direction A. The second elastic member 37 permanently supports the adjusting member 34 in an outward direction, so the adjusting member 34 tends to return to the second position, so as to change and reset the position of the adjusting member 34.

Referring to FIG. 6 and FIG. 8, in an embodiment, a receiving cavity 38 is defined in the positioning member 33. The receiving cavity 38 is located at an end of the positioning member 33 which connects to the positioning base plate 31. An opening of the receiving cavity 38 faces the graphics card slot 111. The containing cavity 38 receives the adjusting member 34, which is movably connected in the containing cavity 38. When the adjusting member 34 is in the first position, the adjusting member 34 is completely contained in the containing cavity 38, so as to position and hold a graphics card with large size and width.

In an embodiment, the adjusting member 34 includes a first snap 342, sides of the receiving cavity 38 are provided with a first slot 381, and the first slot 381 can receive the first snap 342. Through the coordination of the first snap 342 and the first slot 381, the adjusting member 34 being kept captive in the receiving cavity 38, the action of the second elastic member 37 being limited, the movement range of the adjusting member 34 thereby being restricted and more accurate during adjustment.

The adjusting member 34 further includes a positioning portion 344. The positioning portion 344 is located at a bottom of the adjusting member 34. A positioning groove 333 corresponding to the positioning portion 344 is defined in the first support portion 331. When the adjusting member 34 is in the second position, part of the adjusting member 34 protrudes from the receiving cavity 38, and the positioning portion 344 is received in the positioning groove 333, so that the second support portion 341 will abut against the graphics card.

Figure 9:
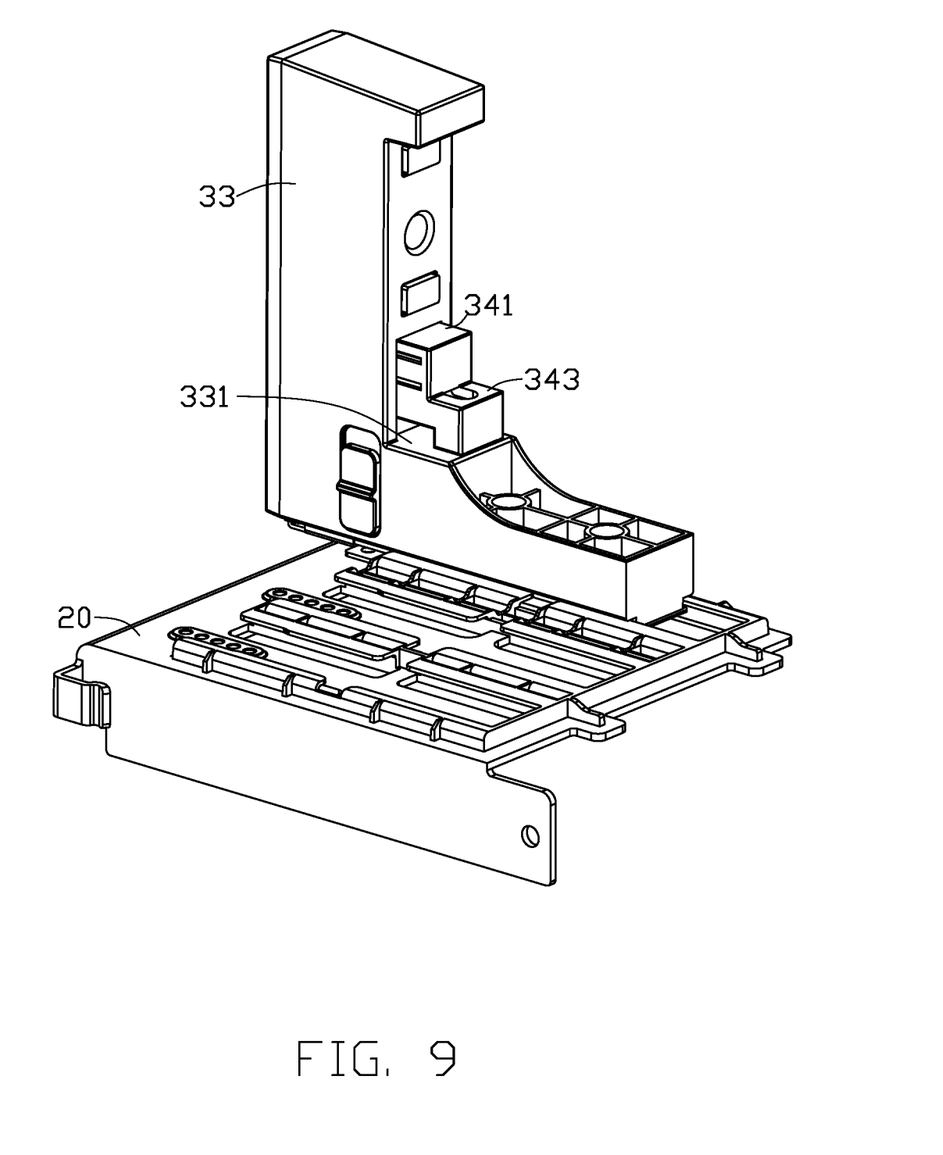
FIG. 9 is a schematic view of a supporting assembly in another embodiment according to the present disclosure.
Figure 10:
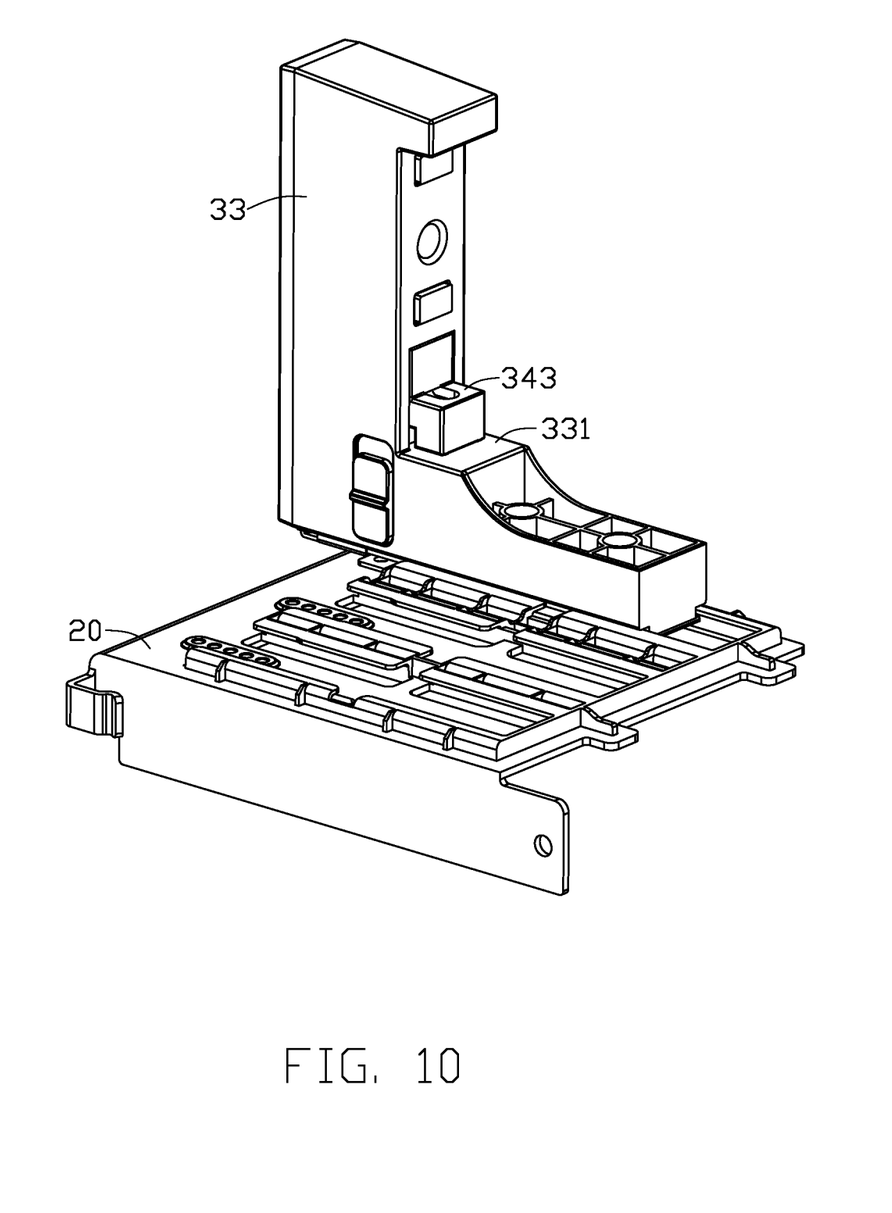
FIG. 10 is a schematic view of an adjusting member in a third position of the supporting assembly of FIG. 9.
Figure 11:
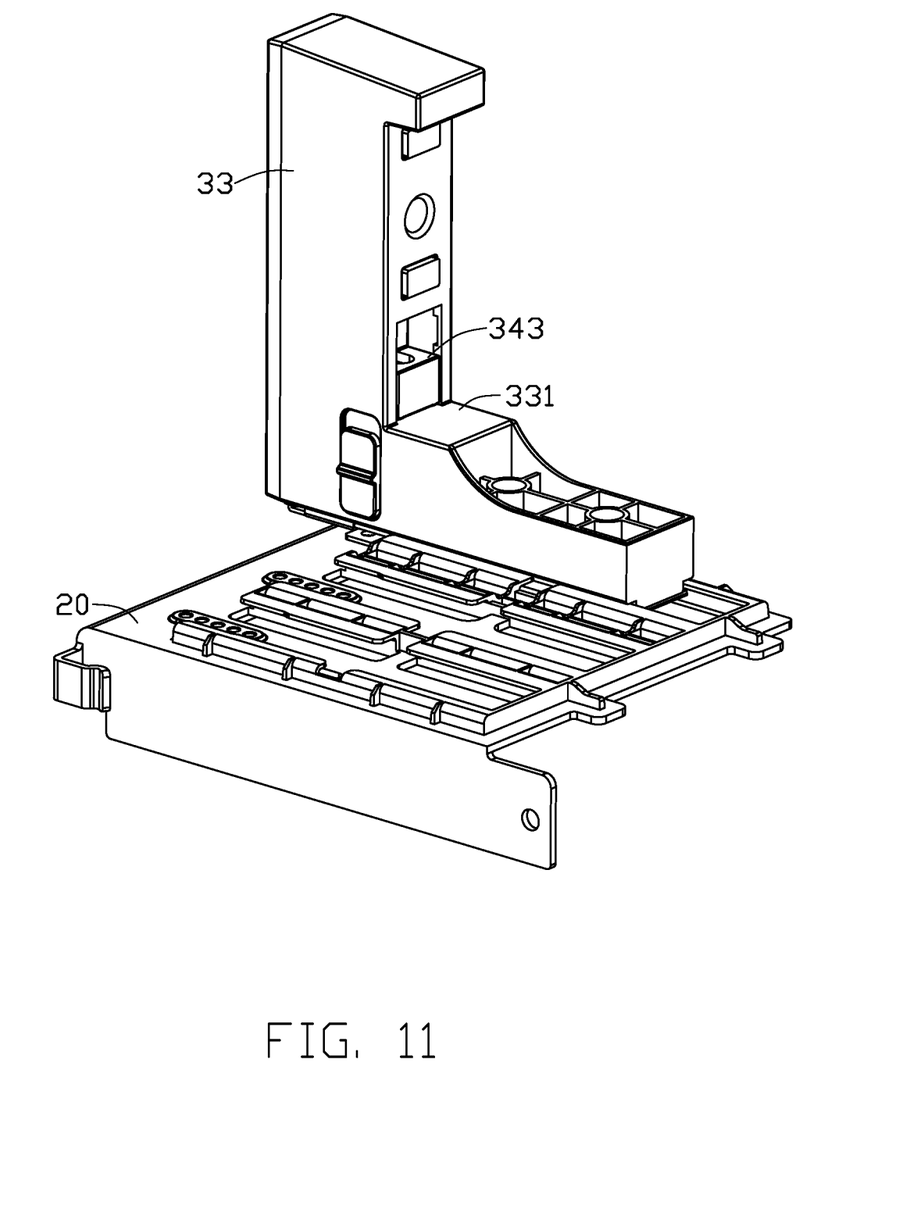
FIG. 11 is a schematic view of an adjusting member in a first position of the supporting assembly of FIG. 9.

Referring to FIG. 9, in another embodiment, the adjusting member 34 also includes a third support 343, the third support 343 is positioned between the first support 331 and the second support portion 341. The third support portion 343 is configured to support a graphics card. The size of the graphics card can match with the third support portion 343 when it is between the sizes of the graphics cards which are supported by the first support 331 and the second support 341. The adjusting member 34 is a stepped structure. FIG. 9 shows the adjusting member 34 in the second position, and the second support portion 341 abuts against the graphics card. The adjusting member 34 can also be moved to a third position, as shown in FIG. 10. At this time, the second support portion 341 is received in the receiving cavity 38, and the bottom side of the end of the graphics card away from the graphics card slot 111 abuts against the third support portion 343. When the adjusting member 34 of the chassis structure 100 is in the first position, as shown in FIG. 11, the graphics card is abutted against the first support 331. This configuration locates and holds graphics cards of the largest width, as in the previous embodiment. The width of current mainstream graphics cards one of the three categories already mentioned. Therefore, the structure of the third support 343 set in this embodiment is applicable to the sizes of most graphics cards on the market, and has a wide application range.

Referring to FIG. 2 and FIG. 3, in an embodiment, the positioning frame 20 is defined with a plurality of positioning holes 21. The positioning holes 21 are spaced in the second direction B, so that the support component 30 can be fixed at different positions on the positioning frame 20, to allow fine adjustment of distance according to the specific specifications of the graphics card, and make the positioning of the graphics card more accurate.

In an embodiment, the positioning baseplate 31 includes a second snap 311, the positioning frame 20 is defined with a second slot 22. The second snap 311 in pairs can be inserted into the second slot 22 in the second direction B. The second snap 311 is positioned on both sides of the positioning base plate 31, and the second snap groove 22 is positioned in pairs on the positioning frame 20 to receive the second snap 311, so as to realize further accuracy in positioning of the support component 30.

In one embodiment, the positioning frame 20 is provided with groups of positioning holes 21 and pairs of the second slot 22 along a third direction C. The third direction C is perpendicular with the first direction A and the second direction B. One row of the positioning holes 21 and one pair of the second card slot 22 allow a group of features, and the positioning frame 20 is provided with multiple groups of these features, so that the support assembly 30 can be positioned at several different positions in the third direction C to adapt to graphics cards of different lengths, or to avoid collisions with fan, openings, and other uneven portions, not used for support, on the graphics card, to improve the stability of positioning.

Even though information and advantages of the present embodiments have been set forth in the foregoing description, together with details of the structures and functions of the present embodiments, the disclosure is illustrative only. Changes may be made in detail, especially in matters of shape, size, and arrangement of portions within the principles of the present embodiments to the full extent indicated by the plain meaning of the terms in which the appended claims are expressed.

What is claimed is:

1. A chassis structure comprising: a housing; a main board positioned in the housing; and a graphics card slot positioned on a side of the main board; wherein the housing comprises: a positioning frame positioned at the side of the main board and substantially parallel to the graphics card slot, and comprising at least one positioning hole; a support assembly detachably fixed on the positioning frame, comprising a positioning base plate, a positioning pin, a positioning member, and an adjusting member, wherein the positioning member is positioned on the positioning base plate in a first direction substantially perpendicular to the graphics card slot, and the positioning member is configured for fixing a graphics card in the graphics card slot, the positioning base plate is detachably fixed on the positioning frame, the positioning pin is movably connected on the positioning member in the first direction, an end of the positioning pin is inserted in the positioning hole, the adjusting member is movably connected in the positioning member, the positioning member comprises a first support portion, the adjusting member comprises a second support portion, the first support portion and the second support portion are spaced apart in the first direction, the graphics card which is connected with the graphics card slot abuts against the first support portion or the second support portion; and a receiving cavity is defined on the positioning member, the receiving cavity comprises an opening facing the graphics card slot, the adjusting member is movably received in the receiving cavity.

2. The chassis structure of claim 1, wherein the support assembly comprises a first elastic member and a switch, the first elastic member and the switch are positioned in the first direction, the first elastic member is connected to each of the positioning pin and the positioning member, the switch is connected to the positioning pin, the switch drives the positioning pin to move in the first direction, causing the positioning pin to penetrate the positioning base plate or be received in the positioning base plate.

3. The chassis structure of claim 2, wherein the switch comprises a pressing portion and at least one connecting portion, the pressing portion and the at least one connecting portion being one piece, the at least one connecting portion is sleeved on the positioning pin, the positioning pin comprises a projection portion, the at least one connecting portion abuts against the projection portion.

4. The chassis structure of claim 3, wherein two of the connecting portions are spaced apart in first direction, the projection portion is positioned between adjacent two of the connecting portions, each of the connecting portion comprises a mounting hole and a connecting groove, the mounting hole communicates with connecting groove, and the connecting groove defines an opening at an end of the connecting portion, the positioning pin is clamped into the mounting hole from the connection groove.

5. The chassis structure of claim 1, wherein the support assembly further comprises a second elastic member positioned in a second direction, the second elastic member connects the adjusting member and the positioning member, the second direction is perpendicular to the first direction.

6. The chassis structure of claim 1, wherein the adjusting member comprises a first snap, a side of the receiving cavity is defined with a first slot, the first snap is received in the first slot.

7. The chassis structure of claim 1, wherein the adjusting member comprises a third support portion configured for abutting against the graphics card, the second support portion is between the first support portion and the third portion.

8. The chassis structure of claim 1, wherein the positioning frame comprises a plurality of the positioning holes, the plurality of positioning holes are placed in a second direction, the second direction is perpendicular to the first direction.

9. The chassis structure of claim 8, wherein the positioning base plate comprises a second snap, the positioning frame is defined with a second slot, the second snap is inserted into the second slot in the second direction.

10. The chassis structure of claim 9, wherein the positioning frame further comprises a plurality of groups of positioning holes and a plurality of pairs of second slots, the plurality of groups of positioning holes and the plurality of pair of second slot are placed in a third direction, the third direction is perpendicular with the first direction and the second direction.

11. A support assembly, comprising: a positioning base plate with a first surface; a positioning pin; a positioning member; and an adjusting member; wherein the positioning member is positioned on the first surface of the positioning base plate, and the positioning member is configured for fixing a graphics card inserted in a card slot of a main board, the positioning pin is movably connected on the positioning member in a first direction perpendicular to the first surface, the adjusting member is movably connected in the positioning member, the positioning member comprises a first support portion, the adjusting member comprises a second support portion, the first support portion and the second support portion are spaced apart in the first direction, the first support portion or the second support portion is configured for abutting against a side of the graphics card; and the support assembly comprises a first elastic member and a switch, the first elastic member and the switch are positioned in the first direction, the first elastic member is connected to each of the positioning pin and the positioning member, the switch is connected to the positioning pin, the switch drives the positioning pin to move in the first direction, causing the positioning pin to penetrate the positioning base plate or be received in the positioning base plate.

12. The support assembly of claim 11, wherein the switch comprises a pressing portion and at least one connecting portion, the pressing portion and the at least one connecting portion being one piece, the connecting portion is sleeved on the positioning pin, the positioning pin comprises a projection portion, the connecting portion abuts against the projection portion.

13. The support assembly of claim 12, wherein two of the connecting portions are spaced apart in first direction, the projection portion is positioned between adjacent two of the connecting portions, each of the connecting portion comprises a mounting hole and a connecting groove, the mounting hole communicates with connecting groove, and the connecting groove defines an opening at an end of the connecting portion, the positioning pin is clamped into the mounting hole from the connection groove.

14. The support assembly of claim 11, wherein the support assembly further comprises a second elastic member positioned along a second direction, the second elastic member connects the adjusting member and the positioning member, the second direction is perpendicular to the first direction.

15. The support assembly of claim 11, wherein a receiving cavity is defined on the positioning member, the adjusting member is movably received in the receiving cavity.

16. The chassis structure of claim 15, wherein the adjusting member comprises a first snap, a side of the receiving cavity is defined with a first slot, the first snap is received in the first slot.

17. The support assembly of claim 16, wherein he adjusting member comprises a positioning portion, the positioning portion is located at a bottom of the adjusting member, a positioning groove corresponding to the positioning portion is defined in the first support portion, when part of the adjusting member protrudes from the receiving cavity, and the positioning portion is received in the positioning groove.

18. The support assembly of claim 11, wherein the adjusting member comprises a third support portion configured for abutting against the graphics card, the second support portion is between the first support portion and the third portion.

* * * * *